US012638470B1

(12) United States Patent
Burka et al.

(10) Patent No.: US 12,638,470 B1
(45) Date of Patent: May 26, 2026

(54) DIGITAL AIR FLOW DETECTION IN A DUCT

(71) Applicant: Arctevity Inc., Woburn, MA (US)

(72) Inventors: Michael Burka, Winchester, MA (US);
Alex Seiger, Manchester, NH (US);
Christopher Egan, Concord, NH (US);
Charlie Landino, Westford, MA (US);
Robert Seliger, Beverly, MA (US)

(73) Assignee: Arctevity Inc., Woburn, MA (US)

( * ) Notice: Subject to any disclaimer, the term of this patent is extended or adjusted under 35 U.S.C. 154(b) by 750 days.

(21) Appl. No.: 18/102,524

(22) Filed: Jan. 27, 2023

(51) Int. Cl.
    *G01P 13/00*     (2006.01)
    *F24F 11/89*     (2018.01)
    *F24F 110/30*     (2018.01)

(52) U.S. Cl.
    CPC ............ *G01P 13/006* (2013.01); *F24F 11/89* (2018.01); *F24F 2110/30* (2018.01)

(58) Field of Classification Search
    CPC ...... G01P 13/006; F24F 11/89; F24F 2110/30
    USPC ...................................................... 73/204.25
    See application file for complete search history.

(56) References Cited

U.S. PATENT DOCUMENTS

| | | | | |
|---|---|---|---|---|
| 5,191,793 A | * | 3/1993 | Drexel | G01F 1/6847 |
| | | | | 73/204.25 |
| 6,209,402 B1 | * | 4/2001 | Yamada | G01F 1/684 |
| | | | | 73/861.26 |
| 7,333,899 B2 | * | 2/2008 | Zimmermann | G01F 1/696 |
| | | | | 702/45 |
| 2012/0232809 A1 | * | 9/2012 | Steckling | G01F 1/696 |
| | | | | 73/204.25 |
| 2015/0082879 A1 | * | 3/2015 | Graff | G01F 1/684 |
| | | | | 73/204.25 |

FOREIGN PATENT DOCUMENTS

JP      2004239104 A    *    8/2004

\* cited by examiner

*Primary Examiner* — Marrit Eyassu
(74) *Attorney, Agent, or Firm* — Cesari and McKenna, LLP

(57) ABSTRACT

A digital air flow detector that includes a pair of thermistors contained in a probe. When installed, an external thermistor is positioned in an air stream, while an insulated thermistor is not. When air is flowing, the air stream will change the temperature of the first thermistor more than the second thermistor. A microcontroller unit measures the temperature difference between the two thermistors and determines whether air is flowing based on the difference. The digital air flow detector outputs an accurate binary indication of whether the air is flowing or not flowing. An air flow detector includes a probe assembly and a printed circuit board assembly coupled to the probe assembly.

12 Claims, 16 Drawing Sheets

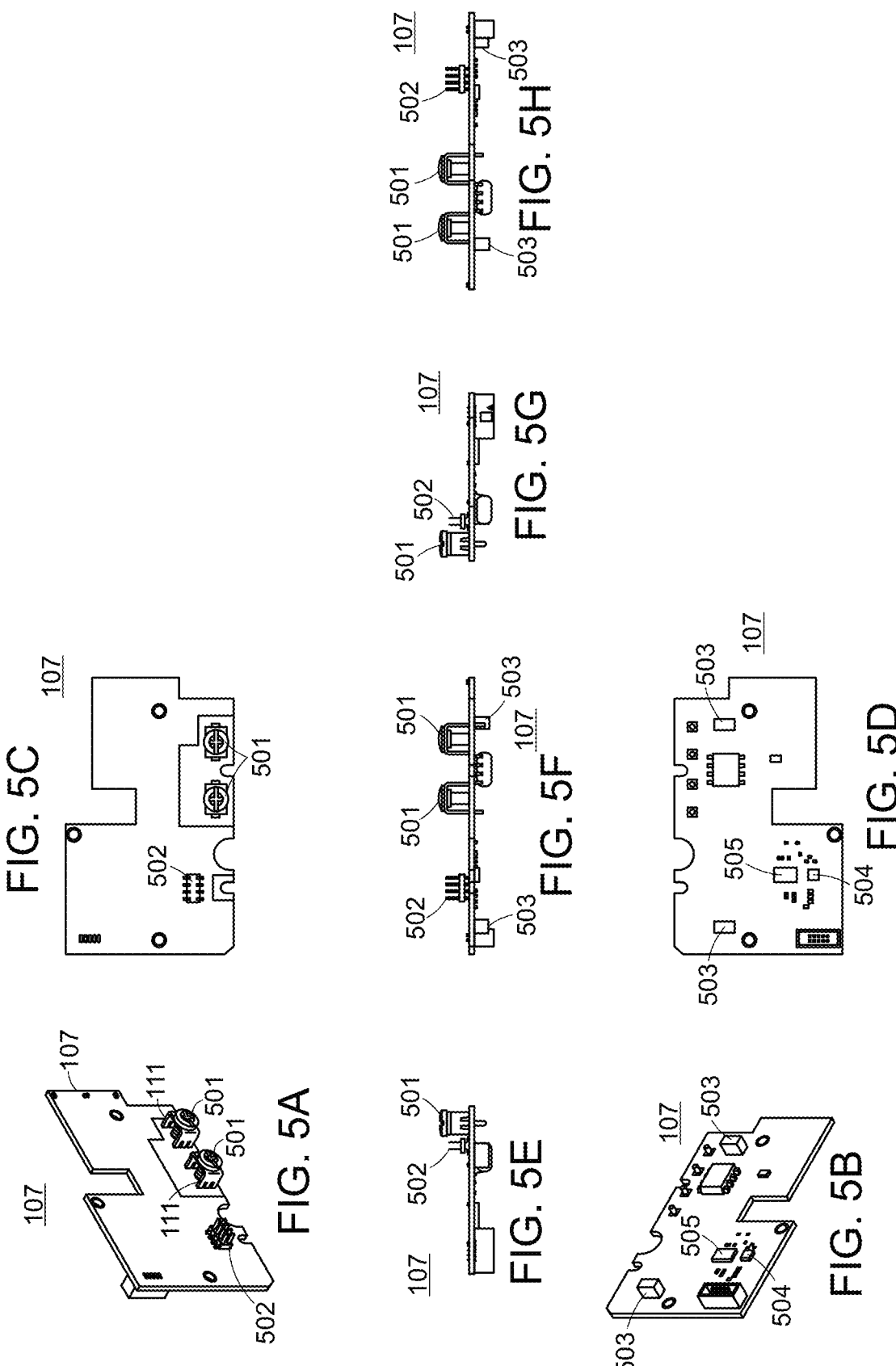

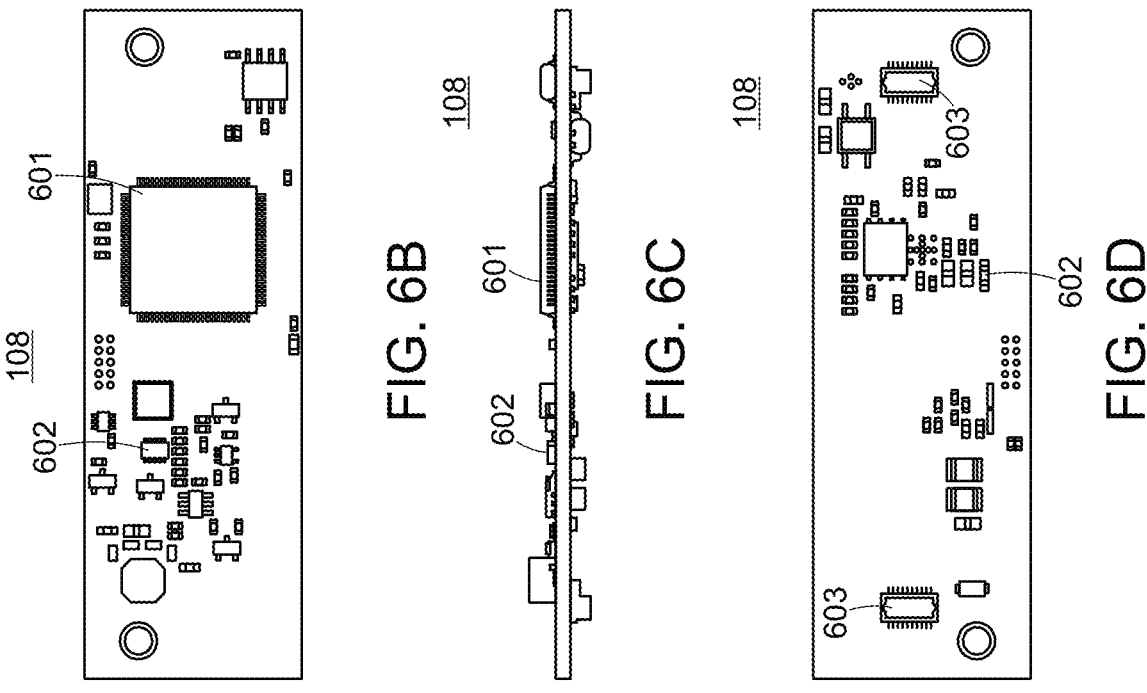
FIG. 6B
FIG. 6C
FIG. 6D
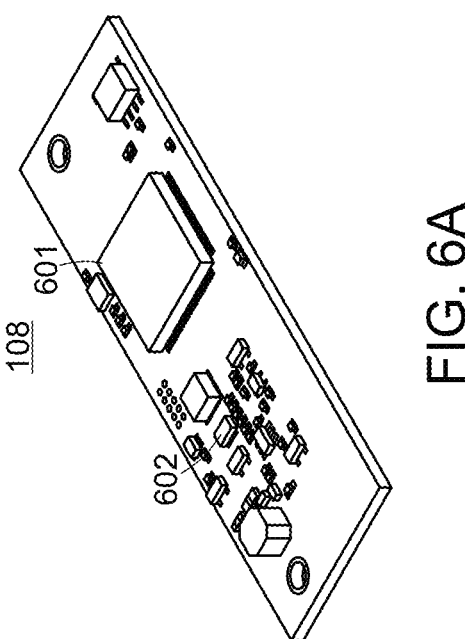
FIG. 6A

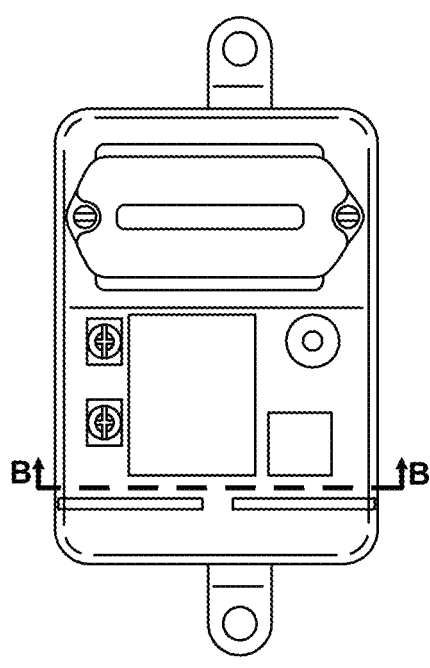
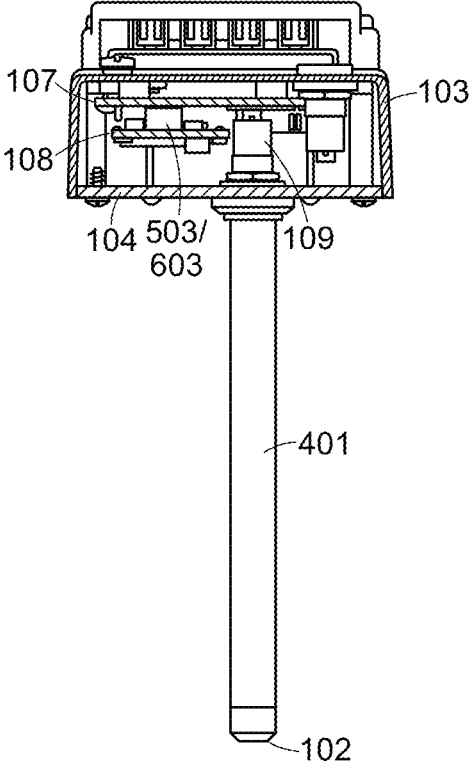
FIG. 8B

DIGITAL AIR FLOW DETECTION IN A DUCT

BACKGROUND ART

The detection of air flow in a duct may be desirable in a number of situations. For example, the sensing of air flow in a duct can be used to confirm that air is properly flowing in an HVAC system when there is a demand call. Failures, such as broken fan belts and failed motorized zone dampers, can cause air to not flow properly. An example existing device for detecting air flow in a duct relies on mechanical components, such as a rubber diaphragm and a sampling hose that is inserted into the air duct. One side of the diaphragm is exposed to the air pressure in the air duct, while the other side of the diaphragm is not. When air is flowing in the duct, the air deflects the diaphragm, which in turn presses against a swing metal contact, closing a circuit. However, such mechanical devices are cumbersome, their sensitivity can change over time, and they are typically mounted on in-ceiling ductwork that is difficult to access when adjustments are needed. Other existing devices are complicated and costly.

SUMMARY OF THE EMBODIMENTS

In accordance with one embodiment of the invention, an airflow detector includes a probe assembly and a printed circuit board assembly coupled to the probe assembly. The probe assembly includes a cover, a probe circuit board, an external thermistor, and an insulated thermistor. The probe circuit board resides within the cover. The external thermistor is coupled to the probe circuit board and resides outside of the cover. The insulated thermistor is coupled to the probe circuit board and resides within the cover. A change in the first temperature in response to a change in air flow is greater than a change in the second temperature in response to the change in the air flow. The printed circuit board assembly includes one or more microcontroller units (MCUs), which are configured to obtain a first temperature from the external thermistor and a second temperature from the insulated thermistor, calculate a temperature difference between the first temperature and the second temperature, and determine whether the temperature difference indicates that air is flowing. When the temperature difference indicates that air is flowing, the MCUs output an indication. Optionally, when the temperature difference indicates that air is not flowing, the MCUs output another indication.

In one variant of the embodiment, the first temperature is converted to a first voltage, and the second temperature is converted to a second voltage. The MCUs receive a voltage difference (V) between the first voltage and the second voltage as an input. The MCUs calculate an average differential voltage (dV/dt) over a time interval, compare the dV/dt with an on threshold parameter value, and determine a state of an air flow flag parameter. The on threshold parameter value sets a minimum value of dV/dt for an indication of air flow. An 'on' state of the air flow flag parameter indicates that air is flowing, and an 'off' state of the airflow flag parameter indicates that air is not flowing. When the dV/dt exceeds the on threshold parameter value and the state of the air flow parameter is 'off', the state of the airflow flag parameter is set to 'on'.

In another variant of the embodiment, the MCUs further consider a state of a system fan state parameter. An 'on' state of the system fan state parameter indicates that a system fan is on, and an 'off' state of the system fan state parameter indicates that the system fan is off. When the dV/dt exceeds the on threshold parameter value, the state of the air flow parameter is 'off', and the state of the system fan state parameters is 'on', the state of the airflow flag parameter is set to 'on'.

In another variant of the embodiment, when the dV/dt does not exceed the on threshold parameter value, the MCUs compare the dV/dt with an off threshold parameter value. The off threshold parameter value sets a maximum value of dV/dt for an indication of no air flow. When the dV/dt does not exceed the off threshold parameter value and the state of the air flow parameter is 'on', the state of the airflow flag parameter is set to 'off'.

In another variant of the embodiment, when the dV/dt does not exceed the off threshold parameter value, the state of the air flow parameter is 'on', and the state of the system fan state parameters is 'off', the state of the airflow flag parameter is set to 'off'.

In another variant of the embodiment, when the dV/dt does not exceed the on threshold parameter value and exceeds the off threshold parameter value, the MCUs compare an absolute value of dV/dt ($|dV/dt|$) with a drift limit parameter value. The drift limit parameter value sets a value of dV/dt indicating a rapid shift in dV/dt. When $|dV/dt|$ exceeds the drift limit parameter value, the MCUs measure V and compare V with a static on threshold parameter value. The static on threshold parameter value sets the value of V that, when $|dV/dt|$ is less than the drift limit parameter value, indicates that the detector has reached a steady state and that air is flowing. When V exceeds the static on threshold parameter value, the MCUs set the state of the airflow flag parameter to 'on'. When V does not exceed the static on threshold parameter value, the MCUs compare V to a static off threshold parameter value. The static off threshold parameter value sets the value of V that, when $|dV/dt|$ is less than the drift limit parameter value, indicates that the detector has reached a steady state and that air is not flowing. When V is less than the static off threshold parameter value, the airflow flag parameter is set to 'off'.

BRIEF DESCRIPTION OF THE DRAWINGS

The foregoing features of embodiments will be more readily understood by reference to the following detailed description, taken with reference to the accompanying drawings, in which:

FIGS. 5A-5H illustrate top perspective, bottom perspective, top, bottom, left, front, right, and back views, respectively, of the function board of the PCBA according to the embodiment of the digital air flow detector.

FIGS. 6A-6D illustrate bottom perspective, bottom, side, and top views, respectively, of the compute board of the PCBA according to the embodiment of the digital air flow detector.

FIGS. 8A-8B illustrate front and right cross-sectional views, respectively, of the PCBA residing within the housing of the embodiment of the digital air flow detector.

DETAILED DESCRIPTION OF SPECIFIC EMBODIMENTS

Figure 1:
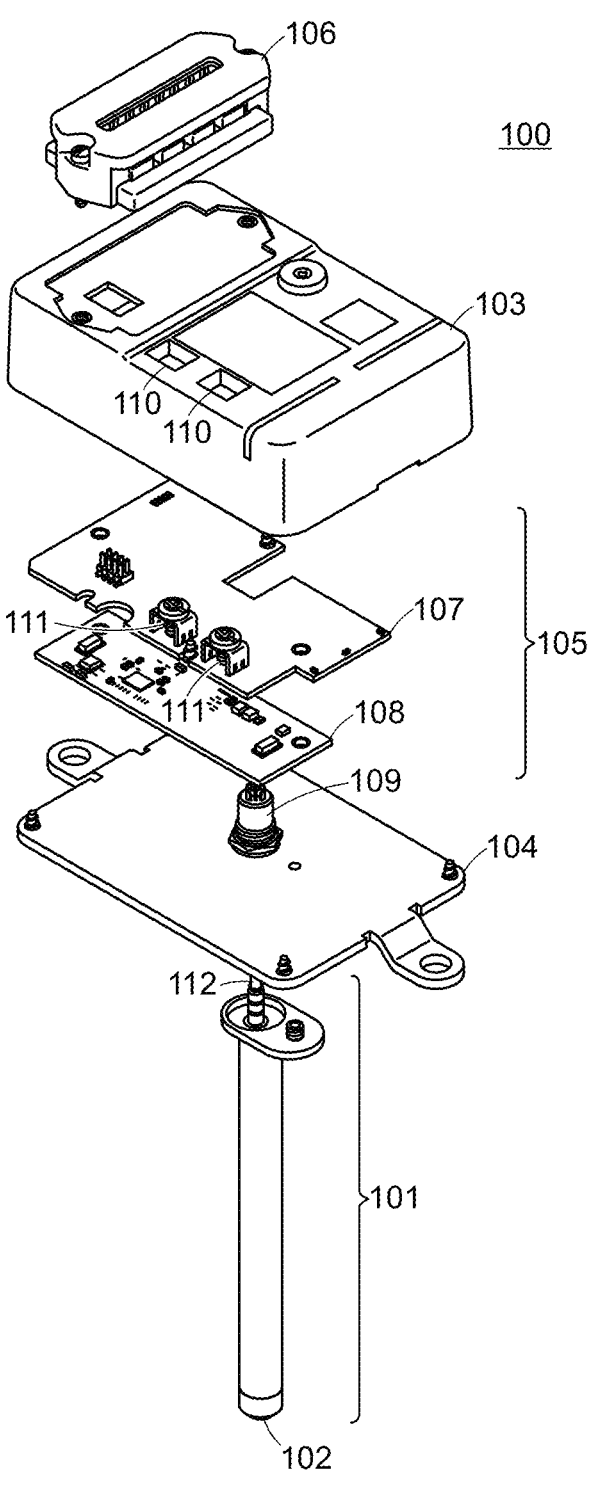
FIG. 1 illustrates an exploded view of an embodiment of the digital air flow detector.

Reference in this specification to "one embodiment," "an embodiment," "an exemplary embodiment," "some embodiments," or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The Figures use the following reference numerals:
100 digital air flow detector
101 probe assembly
102 exposed thermistor
103 main enclosure
104 enclosure mounting flange
105 printed circuit board assembly (PCBA)
106 input-output (IO) module
107 function board of PCBA 105
108 compute board of PCBA 105
109 probe connector
110 openings in main enclosure 103
111 end switches
112 plug
401 tube
403 probe mounting flange
404 screw
405 probe circuit board
406 insulated thermistor
501 external connections to end switches
502 IO module connector
503 connectors on function board 107
504 on-board circuitry for processing air flow

505 function board microcontroller unit (MCU)
601 compute board MCU
602 circuitries with power supply/MCU support
603 connectors on compute board 108
701 connections for probe connector 109
901 differential instrumentation operation amplifier
902 flow indicator LED
903 solid state relay
904 protocol conversation and security microcontroller
905 power and data bus
911 exposed thermistor heater
912 insulated thermistor heater
1300 microcontroller unit
1301 processor
1302 memory
1303 program code
1304 input/output (I/O) interface(s)

Embodiments of the present invention provide a digital air flow detector that includes a pair of thermistors contained in a probe that is inserted into a duct. When installed in the duct, one of the thermistors is positioned in the air stream when the air stream is present, while the other thermistor is not. Both thermistors are heated with an electrical current. When air is flowing through the duct, the air stream will change the temperature of the first thermistor more than the second thermistor. A microcontroller unit in the digital air flow detector measures the temperature difference between the two thermistors and determines whether air is flowing in the duct based on the difference. In the preferred embodiments, the digital air flow detector outputs an accurate binary indication of whether the air is flowing or not flowing.

Figures 2A, 2B:
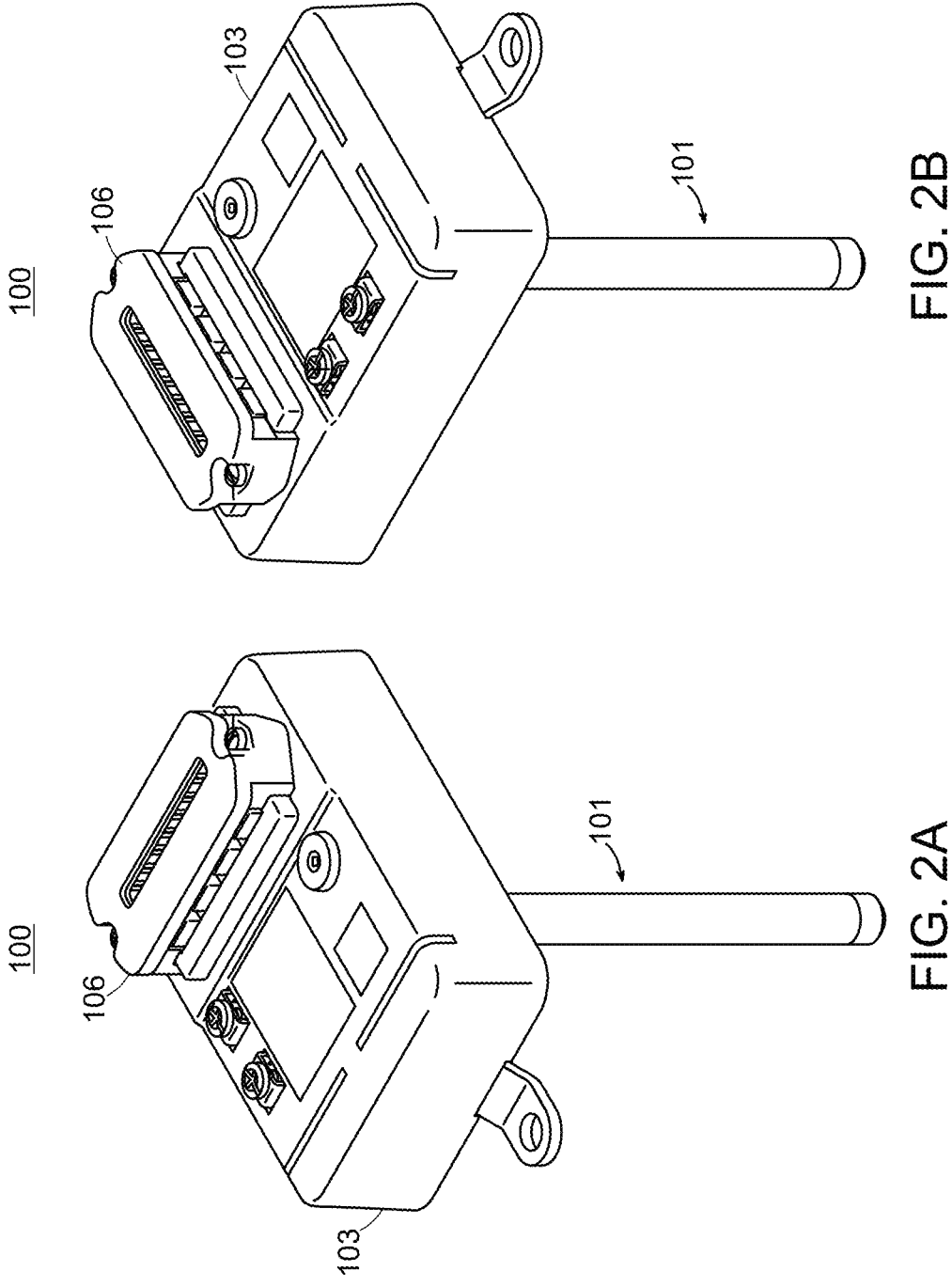
FIGS. 2A-2B illustrate a back perspective view and a front perspective view, respectively, of the embodiment of the digital air flow detector.
Figures 3A, 3B, 3C, 3D, 3E:
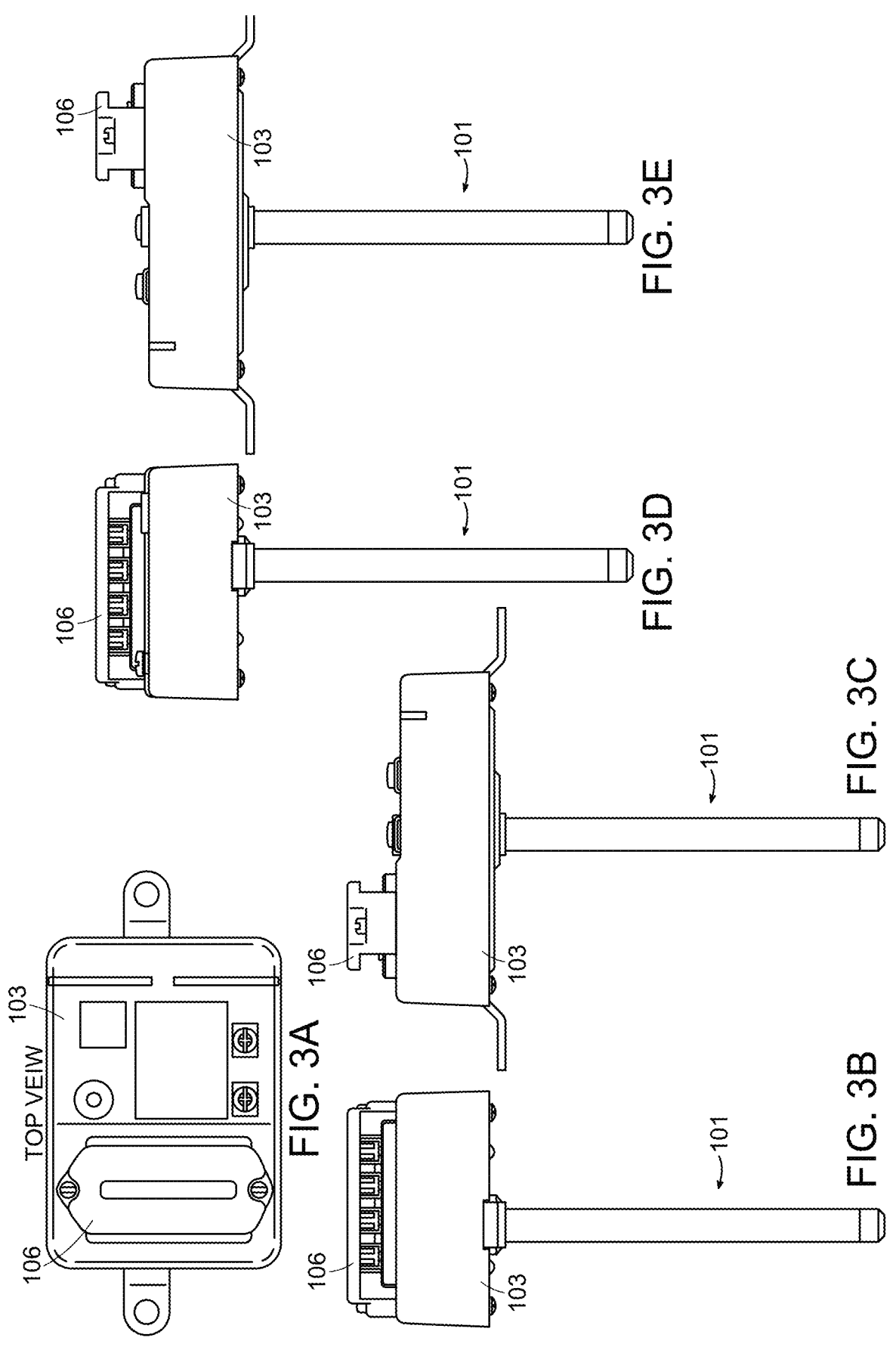
FIGS. 3A-3E illustrate top, left, front, right, and back views, respectively, of the embodiment of the digital air flow detector.

FIG. 1 illustrates an exploded view of an embodiment of the digital air flow detector 100. FIGS. 2A-2B illustrate a back perspective view and a front perspective view, respectively, of the embodiment of the digital air flow detector 100. FIGS. 3A-3E illustrate top, left, front, right, and back views, respectively, of the embodiment of the digital air flow detector 100. The digital air flow detector 100 includes a probe assembly 101. The probe assembly 101 includes an exposed thermistor 102 and an insulated thermistor (not visible) coupled to a plug 112. The probe assembly 101 is described further below with reference to FIGS. 4A-4G. The digital air flow detector 100 also includes a main enclosure 103 and an enclosure mounting flange 104. A printed circuit board assembly (PCBA) 105 resides within the main enclosure 103. The PCBA 105 includes a function board 107 and a compute board 108. The compute board 108 includes a combined power supply and microcontroller unit (MCU) board. The PCBA 105 is described further below with reference to FIGS. 5A-7E. The plug 112 of the probe assembly 101 is coupled to the function board 107 via a probe connector 109. The plug 112 transmits thermistor signals from the probe assembly 101 to the PCBA 105. The detector 100 further includes an input-output (IO) module 106 for coupling to a cable (not shown) that would connect the detector 100 to an external system. Optionally, wiring (not shown) can be connected to a set of end switches 111 on the function board 107 for obtaining readings from the thermistors.

Figures 4A, 4B, 4C, 4D, 4E, 4F, 4G:
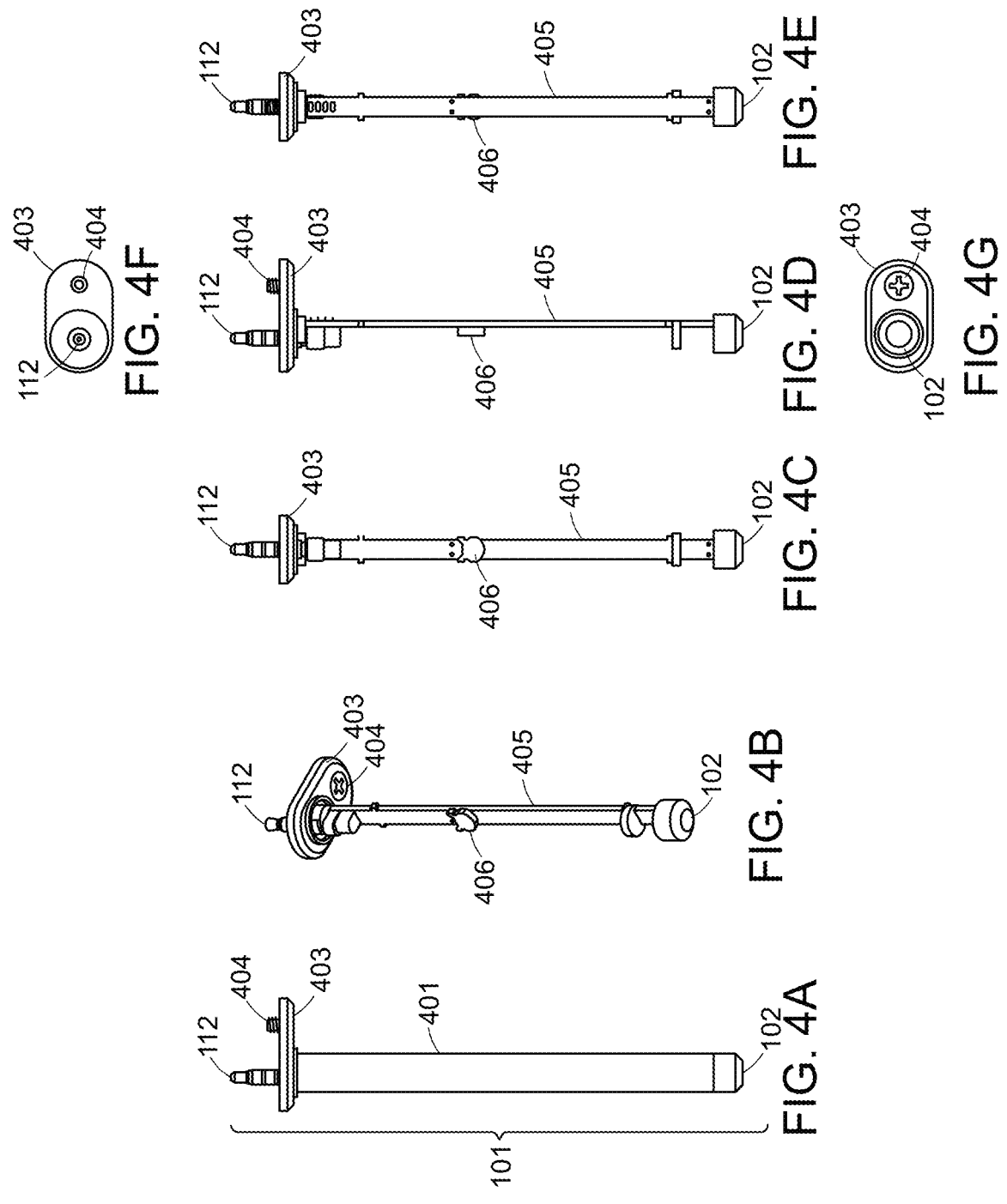
FIG. 4A illustrates the probe assembly of the embodiment of the digital air flow detector with a tube.
FIGS. 4B-4G illustrate perspective, left, front, right, top, and bottom views, respectively, of the probe of the embodiment of the digital air flow detector without the tube.
Figure 7A:
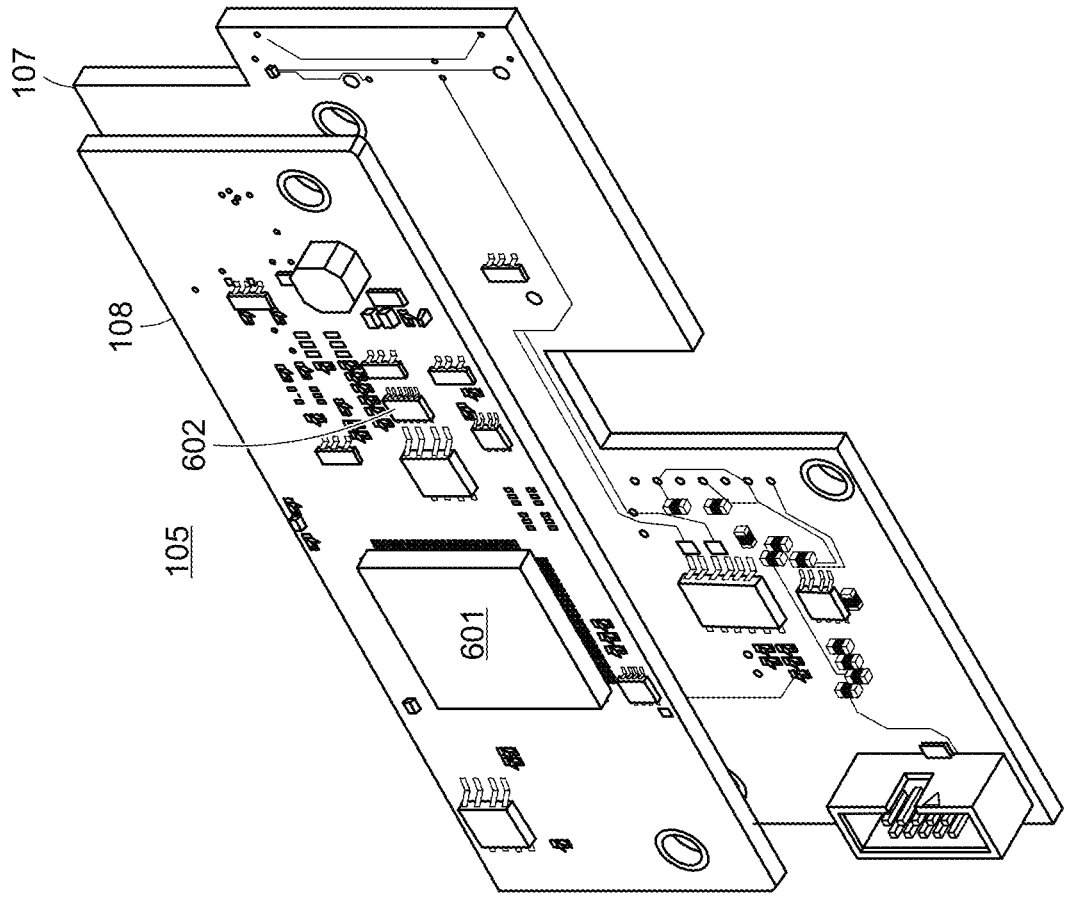
FIGS. 7A-7E illustrate bottom perspective, top, bottom, front, and right views, respectively, of the connections between the function board and the compute board of the PCBA according to the embodiment of the digital air flow detector.
Figure 7B:
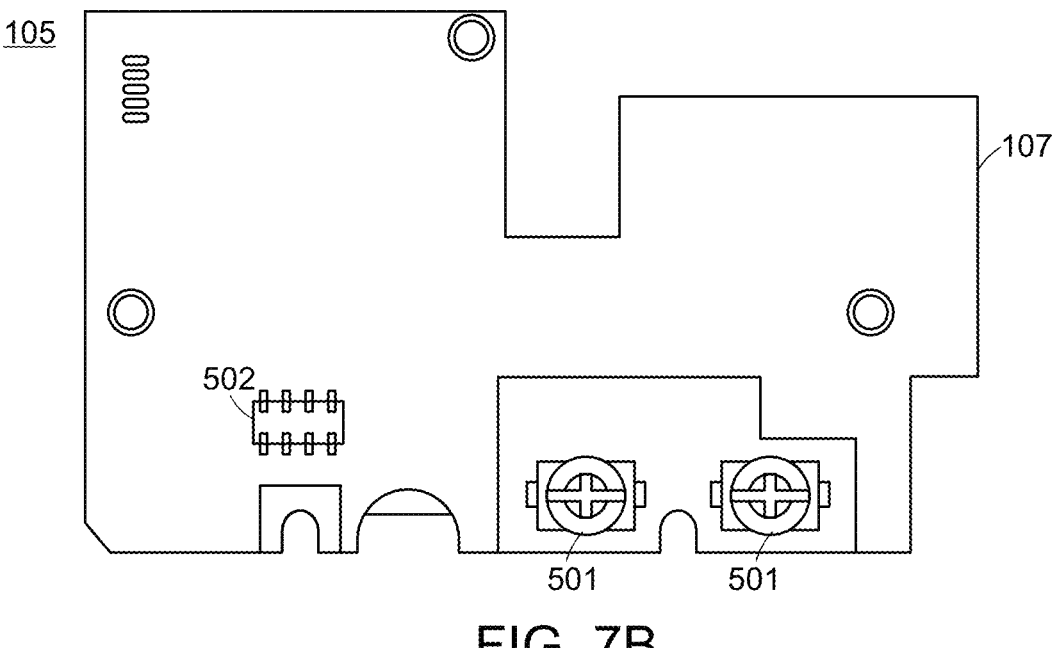
Figure 7C:
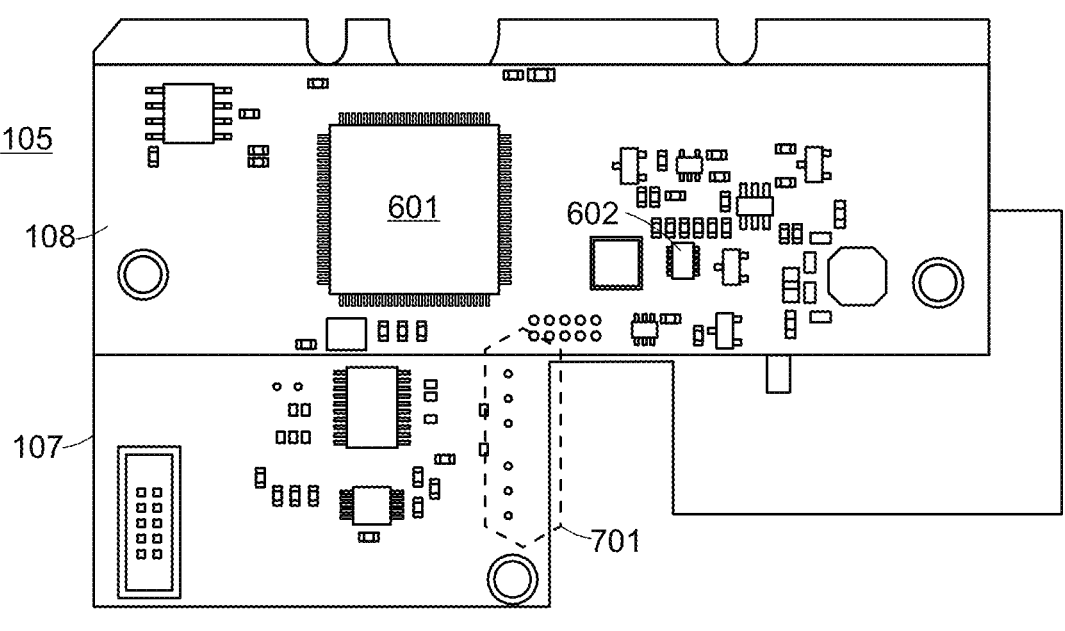
Figure 7D:
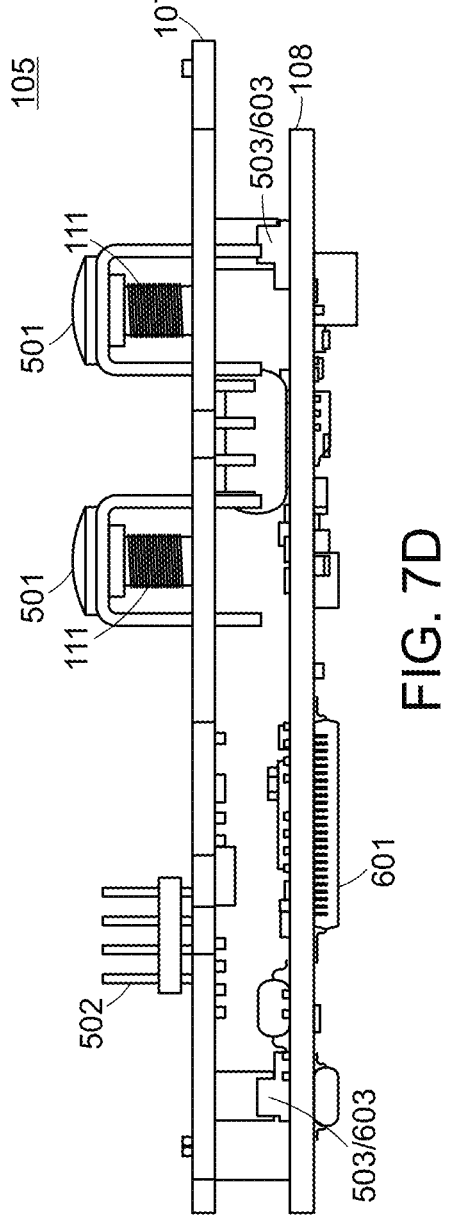
Figure 7E:
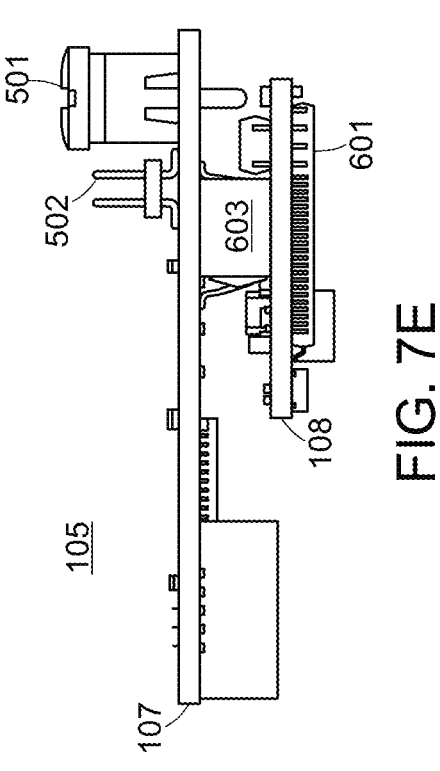

FIG. 4A illustrates the probe assembly 101 of an embodiment of the digital air flow detector 100 with a tube 401. FIGS. 4B-4G illustrate perspective, left, front, right, top, and bottom views, respectively, of the probe 112 without the tube 401. The probe assembly 101 includes a probe circuit board 405 coupled to the plug 112 at a first end and to the exposed thermistor 102 at a second and opposite end. The probe circuit board 405 is further coupled to an insulated thermistor 406. As illustrated in FIG. 4A, the probe circuit board 405 resides within a tube 401, with the insulated thermistor 406 also residing within the tube 401. In an exemplary embodiment, the tube 401 is composed of a thin-walled plastic tube with approximately a ⅜" outer diameter, however, the composition of the tube 401 may vary according to variations in the probe design. The exposed thermistor 102 resides outside of the tube 401. In an exemplary embodiment, the exposed thermistor 102 is encapsulated in a heat-conducting epoxy. The epoxy protects the exposed thermistor 102 from damage and from accumulating debris that may be present in the air stream. As an alternative to epoxy, the exposed thermistor 102 may also be enclosed in glass or a ceramic coating. The probe assembly 101 further includes a probe mounting flange 403 and a screw 404 to mount the probe assembly 101 to the enclosure mounting flange 104 (see FIG. 1). The plug 112 resides within the probe connector 109, which facilitates the coupling of the plug 112 to the function board 107, as described further below.

When installed in a duct, the exposed and insulated thermistors 102, 406 reside within the duct so that they would sit in the path of any air stream in the duct. The exposed thermistor 102 is installed such that it extends beyond any insulation lines in the interior of the duct. Since the exposed thermistor 102 resides outside of the tube 401, the exposure of the exposed thermistor 102 to any air flowing in the duct is greater than the exposure of the insulated thermistor 406 residing in the tube 401. The exposed and insulated thermistors 102, 406 are heated with an electrical current. In the absence of any significant air flow in the duct, the temperature difference between the thermistors 102, 406 will be of a certain amount. When air is flowing in the duct, the temperature of the ambient air in the duct may change, especially if the air is tempered (e.g., heated or cooled). The air flowing in the duct causes the temperature of both thermistors 102, 406 to increase or decrease. However, since the exposed thermistor 102 is exposed to the air flow more than the insulated thermistor 406, the temperature of the exposed thermistor 102 will increase or decrease more than the temperature of the insulated thermistor 406. The voltage change across both the exposed and insulated thermistors 102, 406 will be proportional to the electrical current and proportional (directly or inversely) to the temperature of the thermistors 102, 406. The voltages from each thermistor 102, 406 are then sent to the PCBA 105 to be processed by the function board 107 and the compute board 108, as described further below.

Although the probe circuit board 405 and the insulated thermistor 406 are described above as residing within a tube, coverings other than a tube may be used. Further, less than the entire probe circuit board 405 may be covered. Any manner of covering of the insulated thermistor 406 may be used, as long as the temperature of the exposed thermistor 102 increases or decreases more than the insulated thermistor 406 in response to increases or decreases in air flow.

Although the digital air flow detector 100 is illustrated above with the probe assembly 101 coupled to the bottom side of the detector 100, the probe assembly 101 may be positioned to protrude from any side to accommodate various applications. In one exemplary embodiment, the probe assembly 101 is coupled to the back side of the detector 100, which allows the housing (the main enclosure 103 and enclosure mounting flange 104) to be secured to the side of an air duct, into which the probe assembly 101 is inserted through a hole in the duct that is located behind the housing.

In another exemplary embodiment, the probe assembly 101 is not configured to directly couple to the PCBA 105. Instead, the probe assembly 101 is inserted into an air duct and coupled to the PCBA 105 via a cable, with the probe assembly 101 coupled to a first end of the cable and the PCBA 105 coupled to a second and opposite end of the cable. This allows the housing to be mounted some distance away from the location of the probe assembly 101, such as to a piece of wall framing. Any type of cable may be used. For example, the probe assembly 101 may be configured to couple to standard off-the-shelf audio-style cables with plug connectors.

FIGS. 5A-5H illustrate top perspective, bottom perspective, top, bottom, left, front, right, and back views, respectively, of the function board 107 of the PCBA 105. The function board 107 includes a set of external connections 501 to the end switches 111. The external connections 501 are accessible through a set of openings 110 in the main enclosure 103 (see FIG. 1). The function board 107 also includes an IO module connector 502 for coupling to the IO module 106 connectors 503 for coupling the function board 107 to the compute board 106. On-board circuitry 504 and a function board microcontroller unit (MCU) 505 processes signals concerning air flow, as described further below.

FIGS. 6A-6D illustrate bottom perspective, bottom, side, and top views, respectively, of the compute board 108 of the PCBA 105. The compute board 108 includes a microcontroller unit (MCU) 601, circuitries 602 containing various circuitry for power supply/MCU support, and connectors 603 to couple the compute board 108 to the function board 107.

Figure 8A:
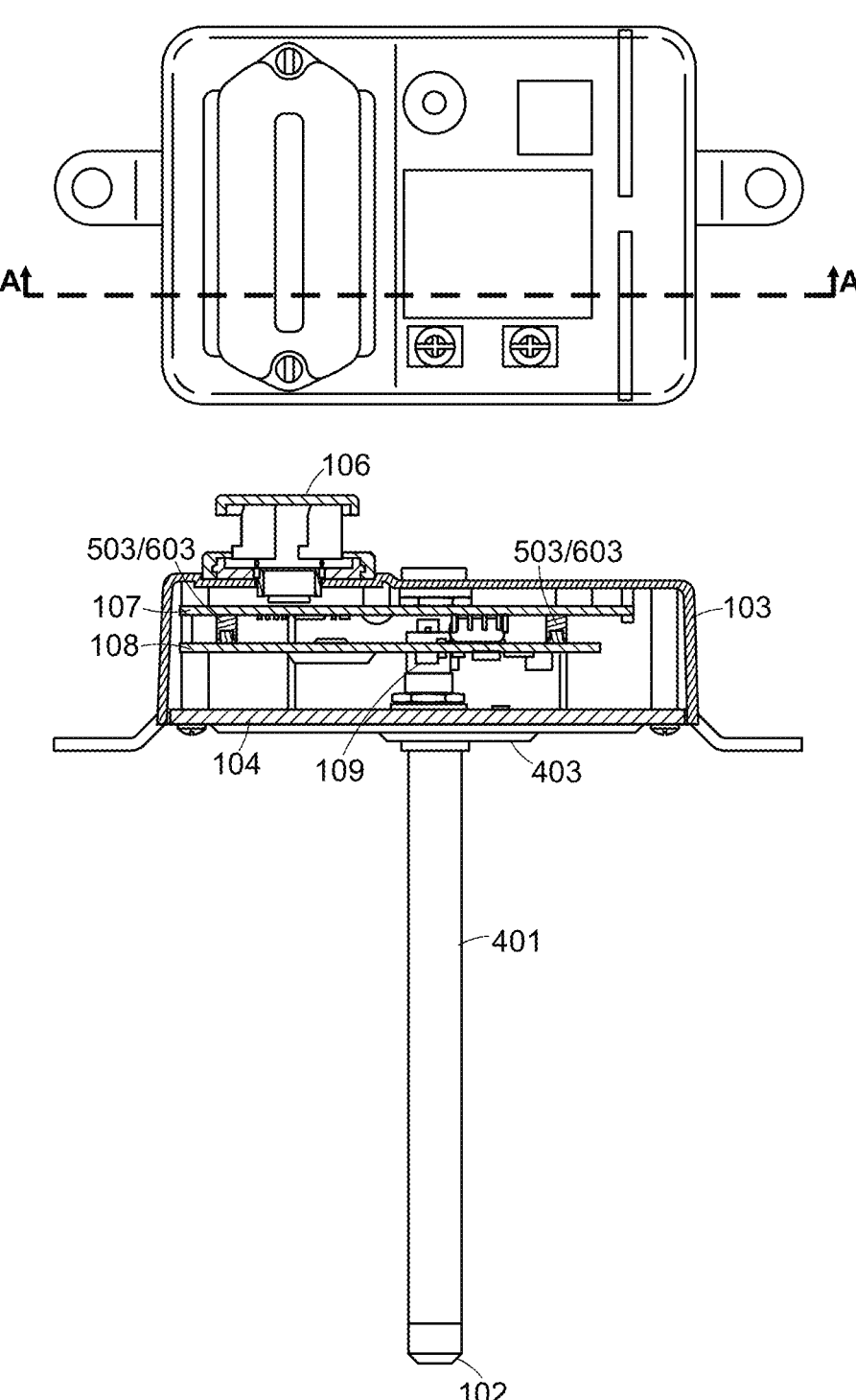

FIGS. 7A-7E illustrate bottom perspective, top, bottom, front, and right views, respectively, of the connections between the function board 107 and the compute board 108 of the PCBA 105. FIGS. 8A-8B illustrate front and right cross-sectional views, respectively, of the PCBA 105 residing within the housing of the digital air flow detector 100. The function board 107 is coupled to the compute board 108 via the coupling of the connector 503 on the function board 107 to the connectors 603 on the compute board 108. The IO module 106 is coupled to the function board 107 via the IO module connector 502. The plug 112 is electrically coupled to the connections 701 on the function board 107 via the probe connector 109. In an exemplary embodiment, the connections 701 include a set of holes at which wires (not shown) are soldered to join the probe connector 109 to the circuitry on the function board 107.

Figure 9:
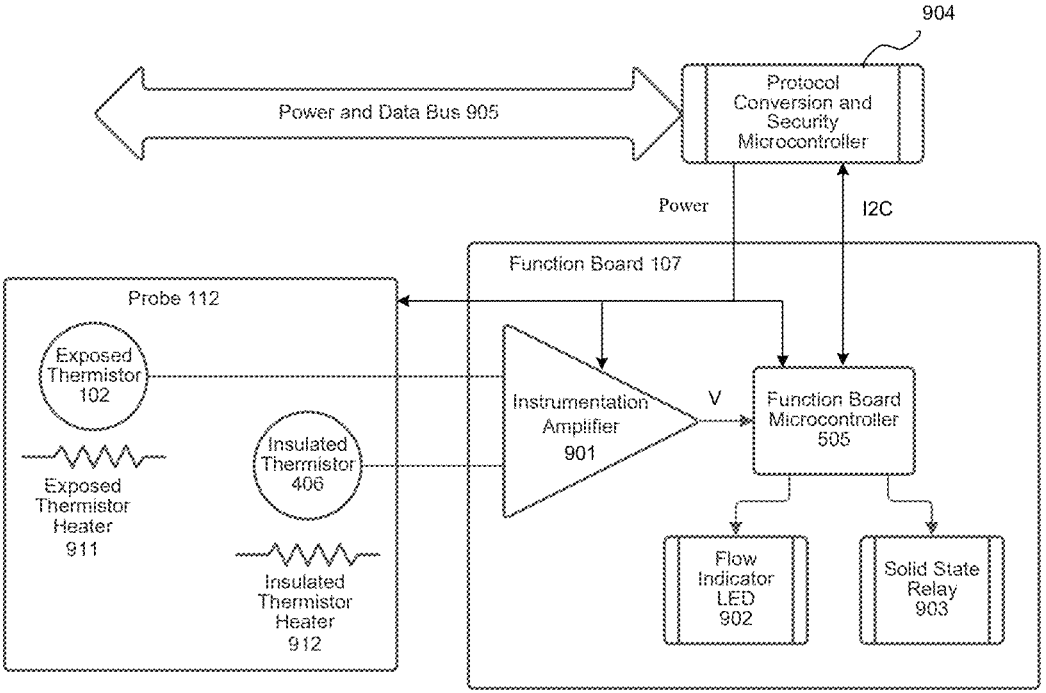
FIG. 9 is a block diagram illustrating the functionalities of the embodiment of the digital air flow detector.

FIG. 9 is a block diagram illustrating the functionalities of an embodiment of the digital air flow detector 100. As described above, the probe assembly 101 includes the exposed thermistor 102 and the insulated thermistor 406. The thermistors 102, 406 are both heated with an electrical current, represented by exposed thermistor heater 911 and insulated thermistor heater 912. The voltage change across each of the thermistors 102, 406 is proportional to the electrical current and proportional to the thermistor temperature. An electronic signal processing circuit on the function board 107 receives analog inputs from the thermistors 102, 406 and digitizes the inputs. A differential instrumentation operation amplifier 901 outputs the voltage difference (V) between the two thermistors 102 and 406. The voltage difference is then processed by the function board MCU 505. A protocol conversion and security microcontroller 904, residing on the compute board 108 in this exemplary embodiment, manages power conveyance and messaging between the detector 100 and outside systems via a power and data bus 905. The microcontroller 904 is configured to perform protocol conversions and apply security protocols to incoming and outgoing messages. In this exemplary embodiment, a network cable is coupled to the power and data bus 905 via the IO module 106.

Figure 10:
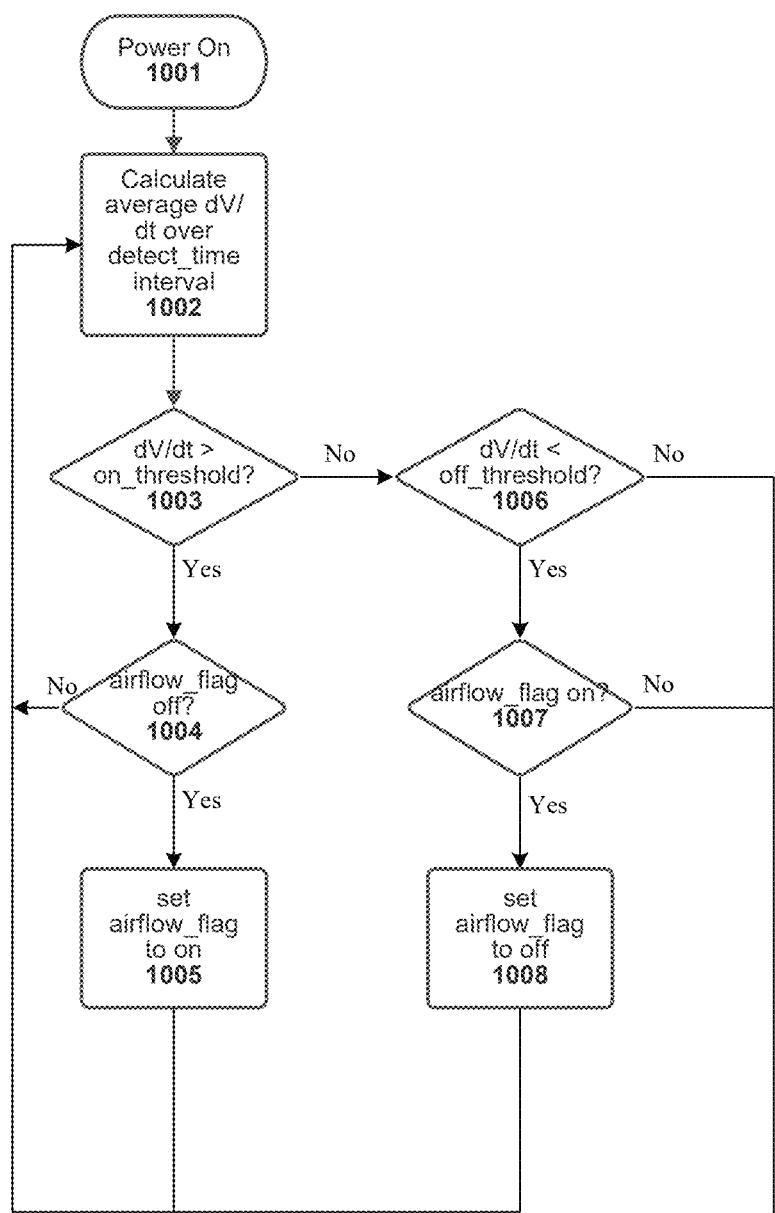
FIG. 10 illustrates processes for determining whether air is flowing in an air duct by the function board MCU according to the embodiment of the digital air flow detector.

FIG. 10 illustrates processes for determining whether air is flowing in an air duct by the function board MCU 505 according to an embodiment of the digital air flow detector. Referring to both FIGS. 9 and 10, after the digital air flow detector 100 is powered on (1001), voltage differences between the two thermistors 102, 406 are processed by the MCU 505. More specifically, the MCU 505 calculates an average differential voltage (dV/dt) between the two thermistors 102, 406, using analog-to-digital converter inputs, over a time interval as configured by a Detect Time Interval parameter (detect_time) (1002). The MCU 505 compares dV/dt to an On Threshold parameter value (on_threshold) (1003). The On Threshold parameter sets the minimum value of dV/dt for an indication of air flow, in order to discount for signal noise or small temperature fluctuations in the air duct. If dV/dt exceeds on_threshold, then this may indicate that air is flowing in the duct. The MCU 505 checks the state of an airflow parameter (airflow_flag) (1004). An 'on' state of airflow_flag indicates that air is flowing in the duct, and an 'off' state indicates that air is not flowing in the duct. If the state of airflow_flag is 'off', then the MCU 505 sets the state of airflow_flag to 'on' (1005). Otherwise, no change to the state of airflow_flag is made. If dV/dt does not exceed on_threshold, then the MCU 505 compares dV/dt to an Off Threshold parameter value (off_threshold) (1006). The Off Threshold parameter sets the maximum value of dV/dt for an indication of no air flow. If dV/dt is below off_threshold, then this may indicate that no air is flowing. The MCU 505 checks the state of airflow_flag. If the state of airflow_flag is 'on' (1007), then the MCU 505 sets airflow_flag to 'off' (1007). Otherwise, no change to airflow_flag is made, and the MCU 505 continues to calculate the voltage difference between the thermistors 102, 406 (1002). To account for hysteresis, when the voltage difference between the thermistors 102, 406 falls between on_threshold and off_threshold, no change to the state of airflow_flag is made.

Figure 11:
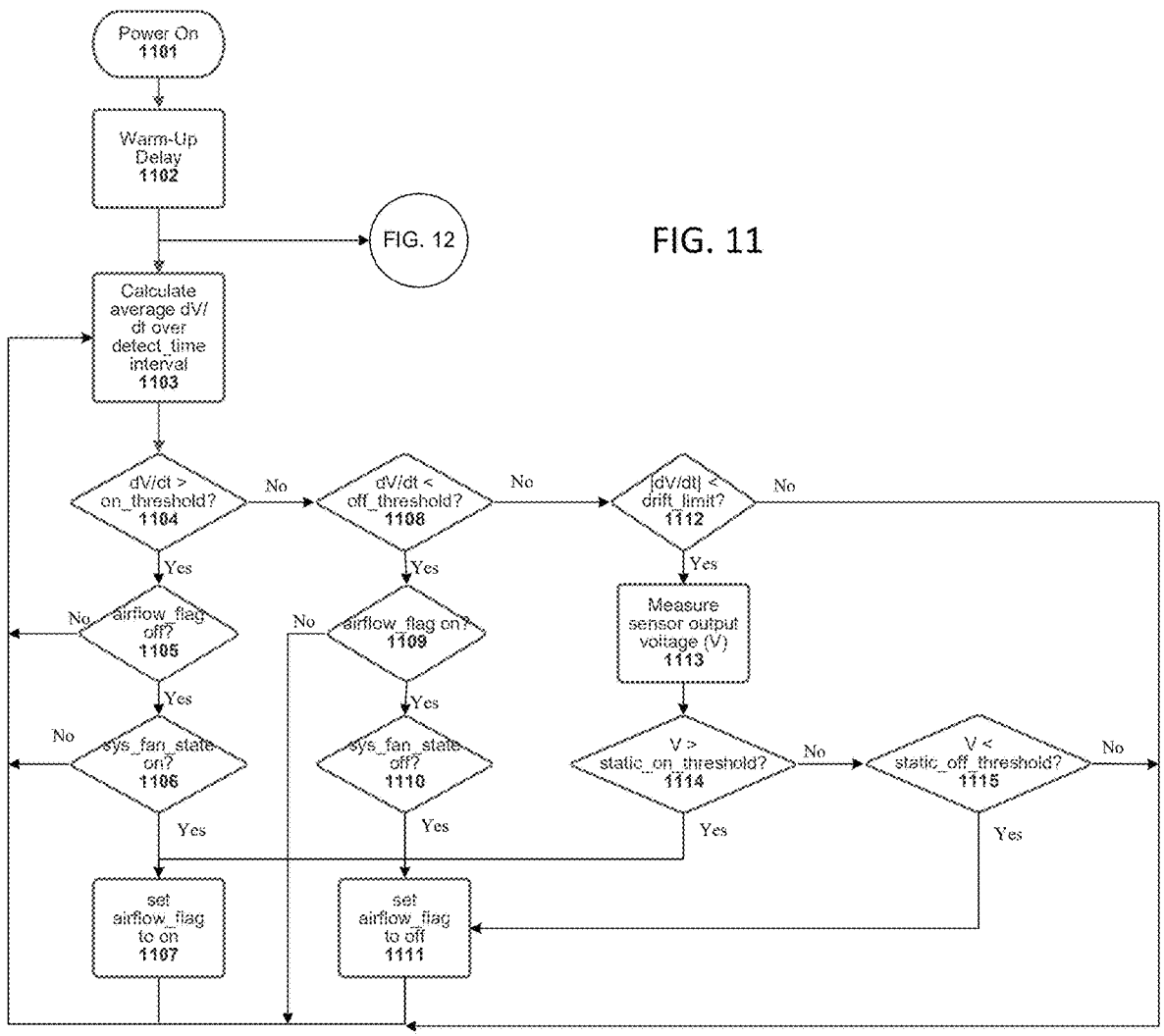
FIG. 11 illustrates processes for determining whether air is flowing in an air duct by the function board MCU according to another embodiment of the digital air flow detector.

FIG. 11 illustrates processes for determining whether air is flowing in an air duct by the function board MCU 505 according to another embodiment of the digital air flow detector. In this exemplary embodiment, the state of a system fan parameter (sys_fan_state) is considered. By accounting for the state of the system fan, the responsiveness and accuracy of the determination of the existence of air flow in the duct can be improved. In a scenario where the air flow in a duct changes after air has been flowing through the duct for some time, the voltage difference between the thermistors 102, 406 may be smaller than in a scenario where the air begins to flow through the duct from an 'off' state. A building control system, for example, sets the sys_fan_state to 'on' when the system fan is running and to 'off' when the system fan is not running. The MCU 505 is configured to account for the state of sys_fan_state in determining whether a voltage difference between the thermistors 102, 106 indicates that air is flowing. In this exemplary embodiment, the value of sys_fan_state is externally sourced, such as from a HVAC system, and communicated to the detector 100 via the power and data bus 905. In a case where a currently flowing system fan changes from a "fan" mode to a "heat" or "cool" mode, the detector 100 may detect a rapid shift in dV/dt. To avoid a false reading of a change in the existence of air flow, the MCU 505 may further be configured to consider a drift limit parameter (drift_limit). The drift limit parameter sets a value for dV/dt over which is an indication of such a rapid shift instead of an actual change in the existence of air flow.

Referring to both FIGS. 9 and 11, after the digital air flow detector 100 is powered on (1101) and allowed to warm-up (e.g., with a delay of 30 seconds) (1102), the MCU 505 calculates dV/dt over detect_time interval (1103). The MCU 505 compares dV/dt to on_threshold (1104). If dV/dt exceeds on_threshold, the MCU 505 checks the state of airflow_flag (1105) and the state of sys_fan_state (1106). If the state of airflow_flag is 'off', and the state of sys_fan_state is 'on', then the MCU 505 sets the state of airflow_flag to 'on' (1107). Otherwise, no change to the state of the airflow_flag is made, and the MCU 505 continues to calculate the voltage difference between the thermistors 102, 406. If dV/dt does not exceed on-threshold but is below off_threshold (1108), then this may indicate that no air is flowing. The MCU 505 checks the states of airflow_flag (1109) and sys_fan_state (1110). If the state of the airflow_flag is 'on' and the state of sys_fan_state is 'off', then the MCU 505 sets airflow_flag to 'off' (1107). Otherwise, no change to airflow_flag is made, and the MCU 505 continues to calculate the voltage difference between the thermistors 102, 406. If dV/dt does not exceed on_threshold and exceeds off_threshold, then the MCU 505 checks whether the absolute value of dV/dt exceeds drift_limit (1112). If |dV/dt| exceeds drift_limit, then the change indicated by |dV/dt| is ignored, and the state of airflow_flag is unchanged. If |dV/dt| does not exceed drift_limit, then the MCU 505 measures the sensor output voltage (V) (1113). The MCU 505 compares V to a static_on_threshold parameter value (1114). The static_on_threshold parameter value is the sensor output voltage (V) that, when |dV/dt| is less than drift_limit, indicates that the detector 100 has reached a steady state and that air is flowing. If V exceeds static_on_threshold, then the MCU 505 sets airflow_flag to 'on' (1107). Otherwise, the MCU 505 compares V to a static_off_threshold parameter value (1115). The static_off_threshold parameter value is the sensor output voltage (V) that, when |dV/dt| is less than drift_limit, indicates that the detector 100 has reached a steady state and that air is not flowing. If V is less than static_off_threshold, then the MCU 505 sets airflow_flag to 'off' (1111). Otherwise, the MCU 505 continues to calculate the voltage difference between the thermistors 102, 406 (1103). In an example scenario, airflow_flag is 'on' when the system fan fails. When dV/dt falls between on_threshold and off_threshold, the sensor output voltage (V) would be less than static_off_threshold due to the system fan not functioning. The sensor output voltage (V) being less than static_off_threshold while airflow_flag is 'on' indicates a system fan failure.

Optionally, when air is determined to be flowing, the MCU 505 may output an indicator, such as an externally visible flow indicator LED 902 (see FIG. 9), to indicate to an observer that air is flowing in the duct. Various other types of indications may be used. Further, the MCU 505 may be configured to open a solid state relay 903 when air is flowing or close the solid state relay 903 when air is not flowing. The solid state relay 903 can be used to complete an external electrical circuit, such as the opening or closing of a motorized zone damper. Further, the MCU 505 may emit digital messages over the power and data bus 905 that may be consumed by an external building control system.

Figure 12:
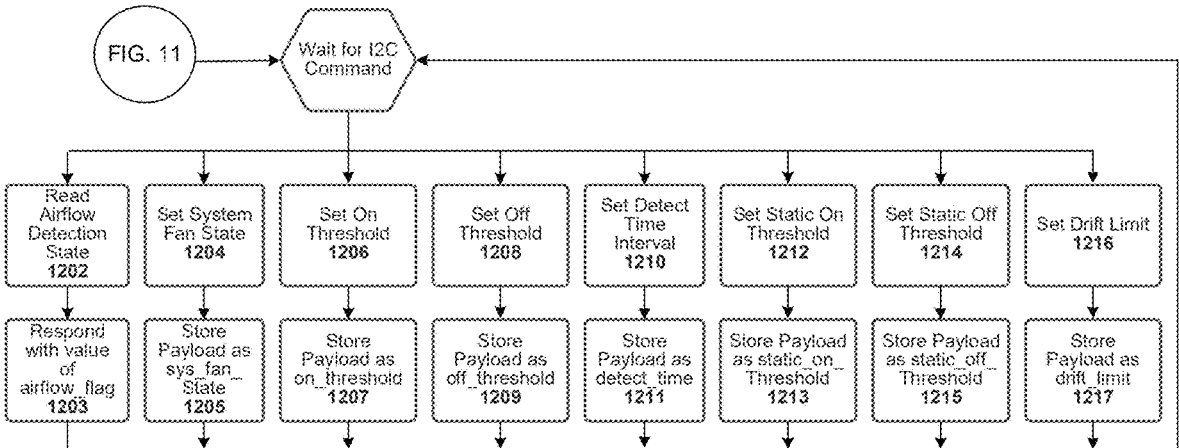
FIG. 12 illustrates example external commands that may be received by the MCU according to the embodiment of the digital air flow detector.

The MCU 505 can be configured to receive external commands via digital communication over the power and data bus 905. Any protocol, such as I2C, may be used. FIG. 12 illustrates example external commands that may be received by the MCU 505 according to an embodiment of the digital air flow detector. For example, the MCU 505 can be configured to respond to queries from an external system. The MCU 505 may receive a request for the airflow detection state. In response, the MCU 505 reads the airflow detection state (1202) and responds with the value of airflow_flag (1203). The MCU 505 can further be configured to receive values for parameters that govern the MCU's algorithm. For example, the MCU 505 receives a command to set the system fan state (1204), and in response, stores the message payload in sys_fan_state (1205). In other examples, the MCU 505 receives a command to set the on_threshold parameter (1206), and in response, stores the message payload as on_threshold (1207). The MCU 505 receives a command to set the off threshold parameter (1208), and in response, the MCU 505 stores the message payload as off_threshold (1209). The MCU 505 receives a command to set the detect time interval parameter (1210), and in response, the MCU 505 stores the message payload as detect_time (1211). The MCU 505 receives a command to set the static on_threshold parameter (1212), and in response, the MCU 505 stores the message payload as static_on_threshold (1213). The MCU 505 receives a command to set the static off threshold parameter (1214), and in response, the MCU 505 stores the message payload as static_off_threshold (1215). The MCU 505 receives a command to set the drift limit parameter (1216), and in response, the MCU 505 stores the message payload as drift_limit (1217).

Figure 13:
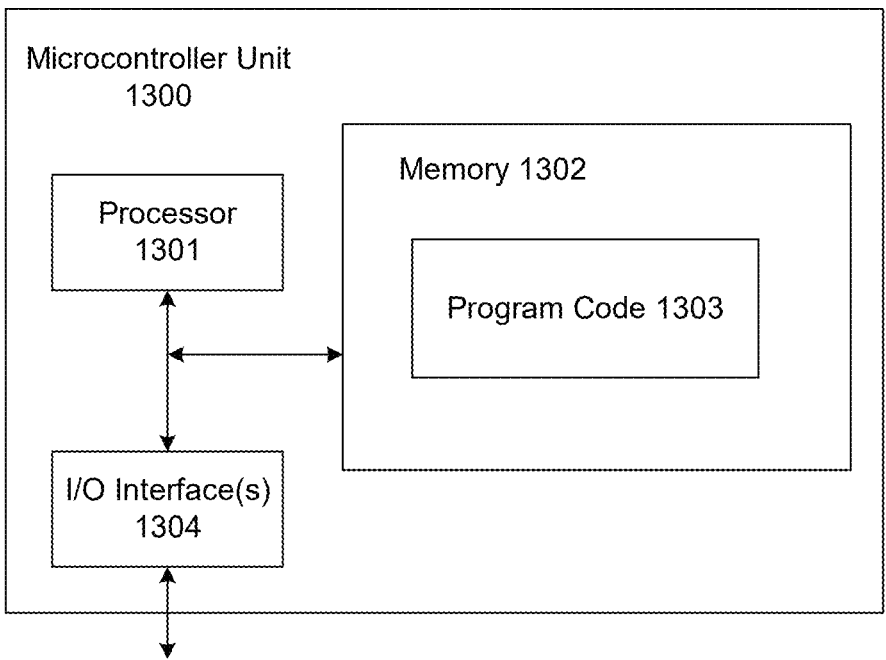
FIG. 13 illustrates an exemplary embodiment of a microcontroller unit, which may be implemented as the function board MCU and/or compute board MCU.

FIG. 13 illustrates an exemplary embodiment of a microcontroller unit, which may be implemented as the function board MCU 505 and/or compute board MCU 601. The microcontroller unit 1300 is operationally coupled to a processor or processing units 1301 and a memory 1302 that couples various system components. The memory 1302 may include computer readable media in the form of volatile memory, such as random access memory (RAM) or cache memory, or non-volatile storage media. The memory 1302 may include at least one program product having a set of at least one program code module 1303 that is configured to carry out the functions of embodiments of the present invention when executed by the processor 1301. The microcontroller unit 1300 may also communicate with one or more external devices via input/output (I/O) interface(s) 1304.

The present invention can take the form of an entirely hardware embodiment or an embodiment containing both hardware and software elements. In a preferred embodiment, the present invention is at least partly implemented in software, which includes but is not limited to firmware, resident software, microcode, etc.

Furthermore, the present invention can include a computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/ W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An airflow detector, comprising:
a probe assembly, comprising:
    a cover;
    a probe circuit board residing within the cover;
    an external thermistor coupled to the probe circuit board and residing outside of the cover;
    an insulated thermistor coupled to the probe circuit board and residing within the cover; and
a printed circuit board assembly coupled to the probe assembly and comprising one or more microcontroller units configured to:
    obtain a first temperature from the external thermistor and a second temperature from the insulated thermistor;
    calculate a temperature difference between the first temperature and the second temperature;
    determine whether the temperature difference indicates that air is flowing; and
    when the temperature difference indicates that air is flowing, output an indication, wherein the first temperature is converted to a first voltage, and the second temperature is converted to a second voltage, wherein the one or more microcontroller units receive a voltage difference (V) between the first voltage and the second voltage as an input, wherein in calculating the temperature difference between the first temperature and the second temperature, the one or more microcontroller units are further configured to:
    calculate an average differential voltage (dV/dt) over a time interval;
    compare the dV/dt with an on threshold parameter value, the on threshold parameter value setting a minimum value of dV/dt for an indication of air flow;
    determine a state of an air flow flag parameter, wherein an 'on' state of the air flow flag parameter indicates that air is flowing, wherein an 'off' state of the airflow flag parameter indicates that air is not flowing; and
    when the dV/dt exceeds the on threshold parameter value and the state of the air flow flag parameter is 'off', set the state of the airflow flag parameter to 'on'.

2. The detector of claim 1, wherein a change in the first temperature in response to a change in air flow is greater than a change in the second temperature in response to the change in the air flow.

3. The detector of claim 1, wherein the one or more microcontroller units are further configured to:
    determine a state of a system fan state parameter, wherein an 'on' state of the system fan state parameter indicates that a system fan is on, wherein an 'off' state of the system fan state parameter indicates that the system fan air is off; and when the dV/dt exceeds the on threshold parameter value, the state of the air flow parameter is 'off', and the state of the system fan state parameters is 'on', set the state of the airflow flag parameter to 'on'.

4. The detector of claim 1, wherein when the dV/dt does not exceed the on threshold parameter value, the one or more microcontroller units are further configured to:
    compare the dV/dt with an off threshold parameter value, the off threshold parameter value setting a maximum value of dV/dt for an indication of no air flow; and
    when the dV/dt does not exceed the off threshold parameter value and the state of the air flow parameter is 'on', set the state of the airflow flag parameter to 'off'.

5. The detector of claim 4, wherein the one or more microcontroller units are further configured to:
    determine a state of a system fan state parameter, wherein an 'on' state of the system fan state parameter indicates that a system fan is on, wherein an 'off' state of the system fan state parameter indicates that the system fan air is off; and
    when the dV/dt does not exceed the off threshold parameter value, the state of the air flow parameter is 'on', and the state of the system fan state parameters is 'off', set the state of the airflow flag parameter to 'off'.

6. The detector of claim 4, when the dV/dt does not exceed the on threshold parameter value and exceeds the off threshold parameter value, the one or more microcontroller units are further configured to:
    compare an absolute value of dV/dt (|dV/dt|) with a drift limit parameter value, the drift limit parameter value setting a value of dV/dt indicating a rapid shift in dV/dt;
    when |dV/dt| exceeds the drift limit parameter value, measure V and compare V with a static on threshold parameter value, the static on threshold parameter value sets V that indicates that the detector has reached a steady state and that air is flowing;
    when V exceeds the static on threshold parameter value, set the state of the airflow flag parameter to 'on';
    when V does not exceed the static on threshold parameter value, compare V to a static off threshold parameter value, the static off threshold parameter value sets V that indicates that the detector has reached a steady state and that air is not flowing; and
    when V is less than the static off threshold parameter value, set the airflow flag parameter to 'off'.

7. The detector of claim 1, wherein the probe assembly is coupled to a first end of a cable and the printed circuit board assembly is coupled to a second end of the cable.

8. A method for detecting air flow, comprising:
    receiving, by one or more microcontroller units (MCUs), a voltage difference (V) between a first voltage and a second voltage, the first voltage corresponding to an external thermistor and converted from a first temperature from the external thermistor, the second voltage corresponding to an insulated thermistor and converted from a second temperature from the insulated thermistor, wherein a change in the first temperature in response to a change in air flow is greater than a change in the second temperature in response to the change in the air flow;
    calculating, by the MCUs, an average differential voltage (dV/dt) over a time interval;
    comparing, by the MCUs, the dV/dt with an on threshold parameter value, the on threshold parameter value setting a minimum value of dV/dt for an indication of air flow;

determining, by the MCUs, a state of an air flow flag parameter, wherein an 'on' state of the air flow flag parameter indicates that air is flowing, wherein an 'off' state of the airflow flag parameter indicates that air is not flowing; and when the dV/dt exceeds the on threshold parameter value and the state of the air flow flag parameter is 'off', set the state of the airflow flag parameter to 'on'.

9. The method of claim 8, further comprising:

determining, by the MCUs, a state of a system fan state parameter, wherein an 'on' state of the system fan state parameter indicates that a system fan is on, wherein an 'off' state of the system fan state parameter indicates that the system fan air is off; and when the dV/dt exceeds the on threshold parameter value, the state of the air flow parameter is 'off', and the state of the system fan state parameters is 'on', setting, by the MCUs, the state of the airflow flag parameter to 'on'.

10. The method of claim 8, wherein when the dV/dt does not exceed the on threshold parameter value, the method further comprises:

comparing, by the MCUs, the dV/dt with an off threshold parameter value, the off threshold parameter value setting a maximum value of dV/dt for an indication of no air flow; and when the dV/dt does not exceed the off threshold parameter value and the state of the air flow parameter is 'on', set the state of the airflow flag parameter to 'off'.

11. The method of claim 10, further comprising:

determining, by the MCUs, a state of a system fan state parameter, wherein an 'on' state of the system fan state parameter indicates that a system fan is on, wherein an 'off' state of the system fan state parameter indicates that the system fan air is off; and when the dV/dt does not exceed the off threshold parameter value, the state of the air flow parameter is 'on', and the state of the system fan state parameters is 'off', set the state of the airflow flag parameter to 'off'.

12. The method of claim 11, wherein when the dV/dt does not exceed the on threshold parameter value and exceeds the off threshold parameter value, the method further comprises:

comparing, by the MCUs, an absolute value of dV/dt (|dV/dt|) with a drift limit parameter value, the drift limit parameter value setting a value of dV/dt indicating a rapid shift in dV/dt;

when |dV/dt| exceeds the drift limit parameter value, measuring V and comparing V, by the MCUs, with a static on threshold parameter value, the static on threshold parameter value sets V that indicates that a steady state has been reached and that air is flowing;

when V exceeds the static on threshold parameter value, setting, by the MCUs, the state of the airflow flag parameter to 'on';

when V does not exceed the static on threshold parameter value, comparing V, by the MCUs, to a static off threshold parameter value, the static off threshold parameter value sets V that indicates that a steady state has been reached and that air is not flowing; and when V is less than the static off threshold parameter value, setting, by the MCUs, the airflow flag parameter to 'off'.

* * * * *